Sept. 29, 1931.   I. C. MOLLESON   1,824,783
EGG OR PANCAKE TURNER
Filed Oct. 28, 1930
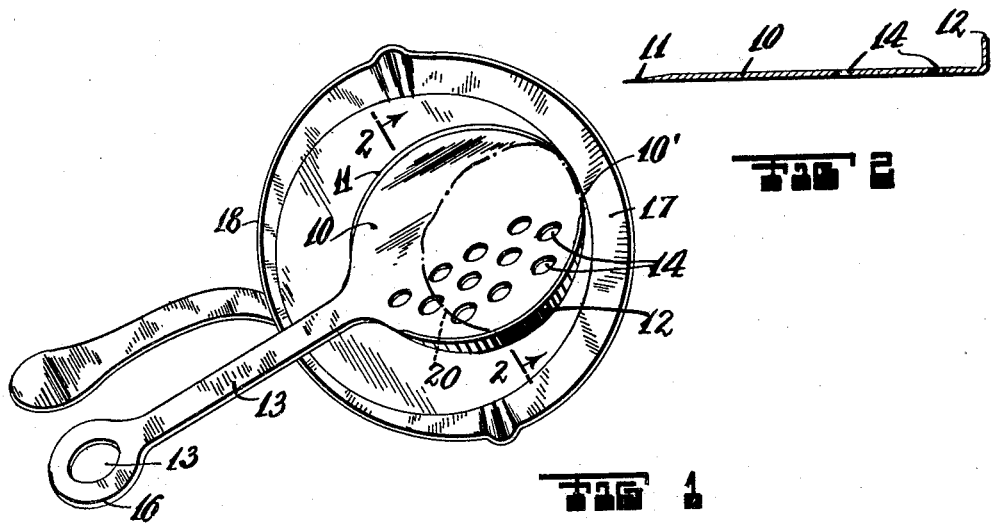
Fig. 1
Fig. 2
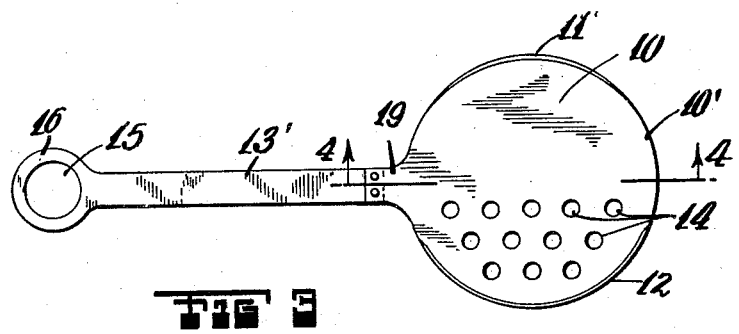
Fig. 3
Fig. 4
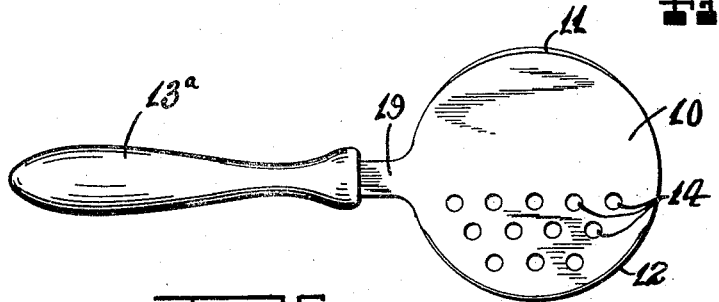
Fig. 5
INVENTOR
Isabelle C. Molleson
BY
ATTORNEY Patented Sept. 29, 1931

1,824,783

UNITED STATES PATENT OFFICE

ISABELLE C. MOLLESON, OF BALDWIN, NEW YORK

EGG OR PANCAKE TURNER

Application filed October 28, 1930. Serial No. 491,678.

This invention relates to new and useful improvements in an egg or pancake turner.

It is general practice to have a flat scoop which is supported by a handle to turn pancakes, eggs or the like on a griddle. The use of such an implement requires great skill before it can be successfully used, and rapidly used without constant damage by breakage of the material being turned.

It is an object of this invention to produce an egg or pancake turner having a small ridge opposite a knife edge on a flat scoop so that the ridge acts as a stop and prevents the falling off of the material being turned. This greatly reduces the skill necessary to manipulate the turner and obviously increases the speed of operation.

It is a further object of this invention to provide a plurality of apertures on the scoop portion of the turner so that the frying agent, such as grease, lard or butter may run out.

It is a further object of this invention to produce a device of the class mentioned which is of simple durable construction, dependable in use and efficient in action, readily cleanable, and which can be manufactured and sold at a reasonable cost.

This invention has for a still further object to provide a device having a round edge opposite the handle to allow the said edge to fit against the inside curvature of a frying pan and thus to conveniently pick up the fried egg or material without allowing same to flow off or hang over the edge of the said device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a device constructed according to this invention.

Fig. 2 is an enlarged transverse sectional view taken on the line 2—2 of Fig. 1.

Fig. 3 is a plan view of a device constructed according to a modified form.

Fig. 4 is a fragmentary sectional view taken on the line 4—4 of Fig. 3.

Fig. 5 is a similar view to Fig. 4, showing another modified form of the device.

The egg or pancake turner comprises a flat scoop 10 formed with a knife edge 11 at one side and with a vertical ridge 12 on the side directly opposite said side 11, and a handle 13 connected with said scoop.

The flat scoop 10 is shown of disc shape. Considering the side of the scoop directly opposite the handle 13 as the front side 10′, and then looking from the handle towards this side the knife edge 11 is arranged upon the left hand side of the scoop. It should be substantially 90°, and the ridge 12 should also be of approximately the same size, but diametrically opposite. The material of the scoop should be bent upwards to form the ridge 12, and the ridge should be so shaped that it be highest at the center and have its edges sloping downwards towards the end.

A plurality of apertures 14 are formed in the scoop 10 within the shadow of the ridge 12 so that grease, lard, butter and the like may run off from the material being turned. The handle 13 preferably should be one piece with the scoop 10 and be provided with a hole 15 at its enlarged free end 16.

The turner may be used as the conventional turner is used, that is, it may be moved laterally so as to cut off the material to be turned which may stick upon the griddle, and such motion causes the material to move upon the top of the scoop. The ridge 12 will prevent it moving too far, and then it is a simple matter to swiftly turn around the scoop by the handle 13 so that the material is now with its bottom side up.

The front side 10′ of the scoop 10 has neither a sharpened knife edge nor a bent ridge, and since its edge is round, it may be adapted to fit against the inner surface 17 of any frying pan 18 so that fried egg or other fried material 20 may be lifted out of the frying pan 18 by the scoop 10, and the fried material will not slide off the front side 10′ of my improved egg or pancake turner.

In Figs. 3 and 4, a handle 13′ is shown to be riveted to the lug element 19 of scoop 10.

In Fig. 5 a handle 13ª of different shape is shown, which may be suitably attached to lug element 19 of the scoop 10, and the location of ridge 12 and knife edge 11 have been reversed on disc 10.

It is to be understood that my device may be made of any suitable material and may be readily punched out of sheet metal. It is easy to clean and may be conveniently hung on any nail, hook or the like when not in use.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desired to secure by United States Letters Patent is:—

1. An egg or pancake turner, comprising a flat scoop formed with a knife edge at one side and a vertical ridge on the side directly opposite said side, and a plurality of apertures in the vicinity of said ridge, and a handle connected with said scoop.

2. An egg or pancake turner, comprising a flat scoop formed with a knife edge at one side and a vertical ridge on the side directly opposite said side, and a handle connected with said scoop, said flat scoop being of disc shape, said knife edge being arranged only upon one side of the scoop considering a line through the handle as one extending from the front to the rear.

3. An egg or pancake turner, comprising a flat scoop formed with a knife edge at one side and a vertical ridge on the side directly opposite said side, and a handle connected with said scoop, said flat scoop being of disc shape, said knife edge being arranged upon the side of the scoop considering a line through the handle as one extending from the front to the rear, a rounded edge integral with and between said knife edge and said ridge, a plurality of apertures formed in the scoop in the vicinity of the said ridge.

In testimony whereof I have affixed my signature.

ISABELLE C. MOLLESON.